United States Patent Office 3,190,122
Patented June 22, 1965

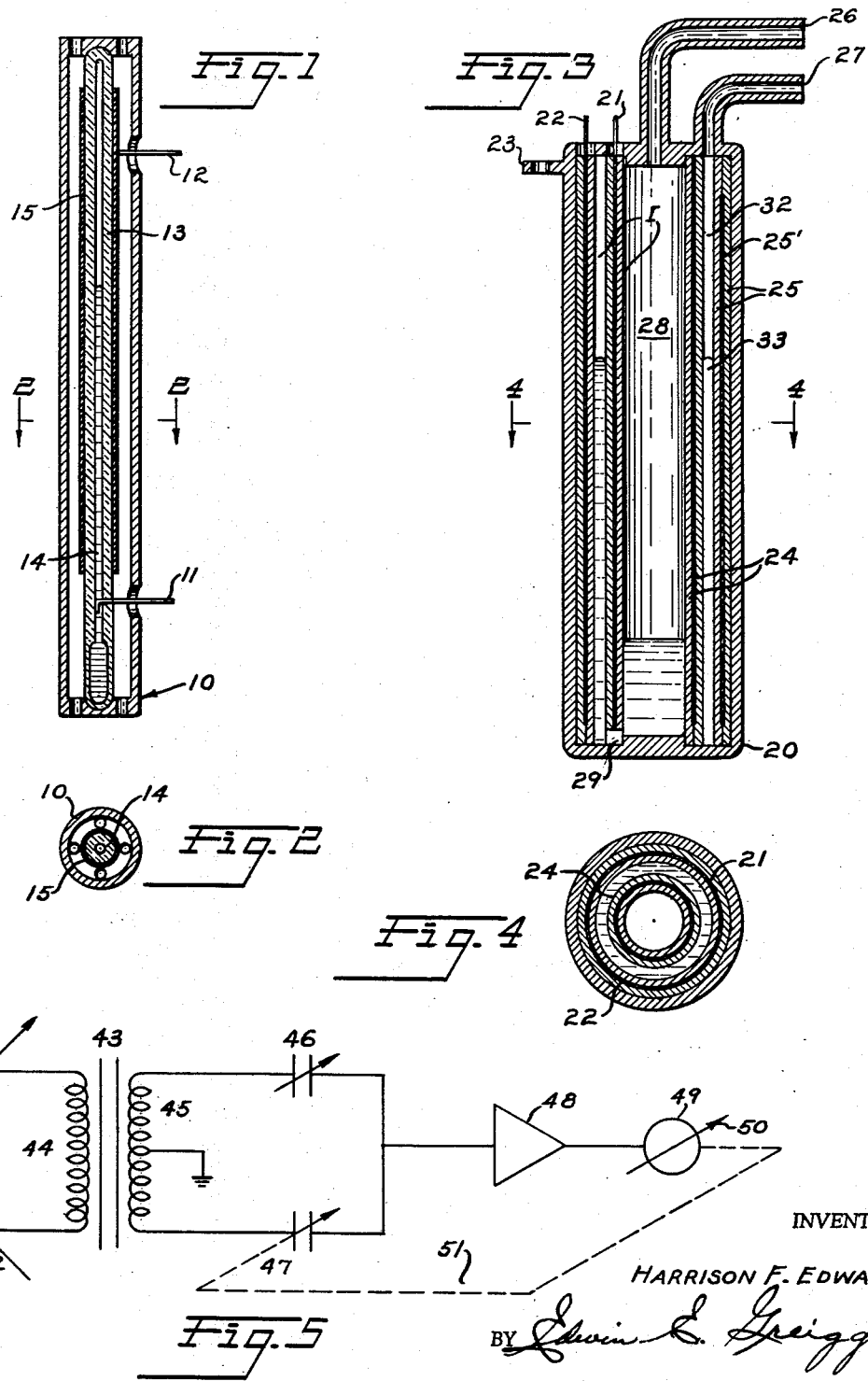

3,190,122
MERCURIAL CAPACITORS FOR REMOTE INDICATION OF PRESSURE
Harrison F. Edwards, Ferrisburg, Vt., assignor to Simmonds Precision Products, Inc., Tarrytown, N.Y., a corporation of New York
Filed Sept. 1, 1960, Ser. No. 53,451
1 Claim. (Cl. 73—398)

The present invention relates to remote temperature and pressure indicators which are simple in design and reliable in use. The invention pertains more particularly to the use of capacitive means for detecting variations in temperature and pressure.

A need has long existed for simple, yet accurate, temperature and pressure indicators. Prior devices have proved unsatisfactory in that the particular indicating means used in combination with temperature or pressure detection means has quite often proved expensive and unreliable. These devices also fail to give an accurate instantaneous reading.

It is therefore the primary object of this invention to provide reliable and accurate pressure and temperature variation detecting means.

It is also another object of this invention to provide pressure and temperature variation detecting means which are simple and inexpensive in construction and, in addition, to furnish an apparatus capable of supplying an accurate instantaneous reading of either pressure or temperature.

More specifically, it is still a further object of this invention to provide an indicator which includes a capacitive element as a detecting means. This capacitive element is included in a capacitance bridge circuit which is self-balancing and which controls a suitable visual scale.

Particularly, it is an object of the present invention to provide a thermometer modified to form a capacitance element of a null balance capacitance readout bridge network, in which the height of the mercury in the thermometer and a metal coating on the stem of the thermometer form the capacitance element.

Correspondingly, it is an object of the present invention to provide a manometer modified to form a simple capacitance element of a null balance capacitance readout bridge network.

In the accompanying drawing illustrating the invention, in the several figues of which like parts are similarly designated, FIG. 1 is a cross-sectional view of the temperature responsive capacitance used in an embodiment of this invention;

FIG. 2 is a cross-sectional view taken along line 2—2 of FIG. 1;

FIG. 3 is a cross-sectional view of the pressure responsive capacitance used in another embodiment of this invention;

FIG. 4 is a cross-sectional view taken along line 4—4 of FIG. 3; and

FIG. 5 is a block diagram of the electrical circuitry which incorporates therein either of the capacitors shown in FIGS. 1-4.

Referring now to the drawing for a detailed description of this invention, there is shown a metallic body 10 having plural apertures in its periphery which houses the temperature detecting capacitor means 46 comprising this invention. As shown in FIGS. 1 and 2, the metal body surrounds a bulb-type thermometer 13 having its bulbous end portions positioned in diametrically opposed recesses provided in the interior of the body 10. This thermometer contains a conventional mercury column 14 in the axial center thereof which is responsive to variations in temperature in the usual manner. A conductive sheath 15 in the form of Conductite paint encompasses substantially the outer periphery of the thermometer and extends over substantially the entire length thereof. While silver paint is the Conductite preferred for this invention, other suitable equivalent substitutions will appear obvious to those conversant with the art. Suitable electrical contacts 11 and 12 are provided for the device as best shown in FIG. 1. Contact 12 is suitably connected with the sheath-like electrode 15. The contact 11 is positioned in the wall of thermometer 13 with a depending end thereof projected downwardly into the mercury column 14. Each of the contact leads 11 and 12 extends through apertures provided in the metallic body 10, as shown. It will now be apparent to those skilled in the art that the mercury column 14 and conductive sheath 15 thus form the plates of a variable capacitor as the temperature varies. Expansion and contraction of the mercury column within the thermometer 13, due to temperature differentials, result in a corresponding change in the capacitance of the unit. This is due to the fact that the capacitance will change substantially in direct proportion to the height of the mercury column within the thermometer.

FIG. 2 illustrates that in this form of the invention the metallic body 10 is in the form of a cylinder and clearly shows the thermometer 13 provided with the conductive sheath 15.

FIGS. 3 and 4 disclose a manometer which utilizes generally a like structure as outlined above in connection with the temperature indicating means shown in FIGS. 1 and 2. This manometer, or pressure responsive capacitor means, includes a metallic body or casing 20 provided with a laterally extending ear 23 which constitutes the ground connection for the system. Extending axially from the top of the casing 20, is an integral hollow fitting 26 that is arranged for connection to a pipe or conduit, not shown. A generally similar hollow fitting 27, also integral with the top of the casing, is positioned for connection to a separate pipe or conduit, not shown. The metallic casing 20 contains a plurality of insulating sleeves indicated generally as I which are concentrically arranged one within the other in two spaced apart pairs. The periphery of the outermost sleeve 25 of the first pair of concentric sleeves 25—25 is juxtaposed with respect to the inner wall of casing 20 and the second of said concentric sleeves is arranged in face-to-face relation therewith but disposed inwardly therefrom. It will be noted that Conductite sheath has been applied at 25' between the faces of said sleeves 25—25 and an electrode 22 is suitably positioned between the sleeves in contact therewith and provided with an upstanding portion which projects through an aperture in the casing 20. Concentrically and spatially disposed within said first pair of sleeves 25—25 is a second pair of concentric insulation sleeves 24—24 arranged with Conductite sheath therebetween and provided with a suitable contact 21 also extending through another aperture in the casing 20. It will be noted that the inner and outer pairs of insulating sleeves 24—24 and 25—25, respectively, are so arranged that they extend longitudinally within the casing 20 and are in spaced apart, parallel concentric relationship. An annular recess 32 is formed between the outermost sleeve 24 and the innermost sleeve 25 contains a column of conductive liquid 33 such as mercury. The hollow tube-like enclosure formed by the inner face of insulating sleeve 24 forms a reservoir 28 for the excess mercury. An opening 29 is provided at the lower extremity of insulating sleeves 24 to permit a free flow of mercury between the reservoir 28 and the annular recess 32 formed between the insulating sleeves. In practice, the fittings 26 and 27 positioned on casing 20 are suitably connected to either side of a pressure differential orifice which would be included in the pipe line. As is well known, a restriction orifice creates a difference in pressure which is proportional to the square of the velocity of liquid flow through the orifice. This creates a higher fluid pressure on one side of the orifice than on the other. In operation therefore, the manometer outlet fittings 26 and 27 will form the high and low pressure connections, respectively, to the pipe line. An increase or reduction in fluid flow will result in a corresponding variation in the height of the mercury in the annular recess 32 of the manometer unit.

In this embodiment of the invention then, contacts 21 and 22, as well as liquid 33, form the plates of a variable capacitor. Any change in the height of the mercury column results in a proportional variation in the capacitance of the unit. The capacitance of the unit is, accordingly, proportional to the pressure differential appearing at the conduit orifice.

FIG. 5 illustrates the electrical circuitry which incorporates the detecting capacitors described above. Variable sensor capacitor 46 represents either the variable temperature responsive capacitor set forth in FIGS. 1 and 2 or the pressure responsive capacitor described in connection with FIGS. 3 and 4. A suitable voltage supply is applied at points 41 and 42 to the primary 44 of transformer 43. The secondary 45 of said transformer is grounded at its center tap. The secondary 45 is in circuit with variable capacitors 46 and 47. As stated hereinbefore, capacitor 46 represents the variable capacitance of either the temperature or pressure responsive units. Elements 46 and 47 form a well-known capacitance bridge which will become unbalanced due to a variation in capacitance of the sensor capacitor 46. This unbalance will produce an output voltage which is applied to a suitable amplifier means 48. The output voltage of amplifier 48 is connected to a servo motor shown generally as element 49. This servo motor includes a suitable pointer element 50 which gives a visual indication of the phenomena detected. A suitable dial calibrated in either degrees of temperature or pounds per square inch will be provided beneath said pointer to facilitate an accurate reading. The servo motor is also drivably connected to capacitor 47 by means represented by dotted line 51. The amplified output voltage caused by unbalance of the capacitance bridge will operate the servo motor which, in turn, will cause a variation in the capacitance of capacitor 47. This latter operation will re-balance the capacitance bridge and return the system to its quiescent, balanced state. The entire action will, of course, result in a different position of the pointer element 50 which is connected to the servo motor 49. This results in a visual indication of any variation in the phenomena being detected whether that phenomena be pressure or temperature.

Various changes and modifications are considered to be within the principle of the invention and the scope of the following claim.

I claim:

In an electrical measuring system, a capacitance bridge having a balanced and an unbalanced condition, said capacitance bridge comprising first and second capacitance elements, said first capacitance element consisting of a variable mercurial capacitor, said mercurial capacitor comprising a hollow metallic casing containing a plurality of insulating sleeves arranged in two concentric, spaced apart pairs, metallic coatings sandwiched between each of said pairs, an annular recess formed by the aforesaid spaced apart insulating sleeves, and an internal recess defined by the innermost sleeve, mercury columns contained in said recesses, said recesses being interconnected at their lower ends, high and low pressure fittings attached to the hollow metallic casing and each communicating with the one of said recesses, whereby the resulting pressure differential of the mercury columns causes a corresponding height variation of said mercury columns, said capacitance bridge being responsive to a change in capacitance of said mercurial capacitor to shift from a balanced to an unbalanced condition, movable gauge means responsive to the unbalanced condition of said capacitance bridge, connecting means between said movable gauge and said second capacitance element such that a movement of said gauge results in a corresponding variation in capacitance of said second capacitance element, with said variation in capacitance of said second capacitance element being operative to restore said capacitance bridge to a balanced condition.

References Cited by the Examiner

UNITED STATES PATENTS

| Re. 24,082 | 11/55 | Smith | 317—246 |
|---|---|---|---|
| 1,658,953 | 2/28 | Theremin. | |
| 2,375,084 | 5/45 | Coroniti et al. | 317—246 |
| 2,688,875 | 9/54 | De Boisblanc et al. | 73—304 |
| 2,703,876 | 3/55 | Edmundson et al. | 73—398 X |
| 2,849,883 | 9/58 | Chapman | 73—401 |
| 2,944,199 | 7/60 | Hudson | 73—398 X |
| 3,023,622 | 3/62 | Hezarifend | 73—401 |
| 3,024,658 | 3/62 | Huddleston | 73—362 |
| 3,134,262 | 5/64 | Dworzan et al. | 73—401 |

FOREIGN PATENTS 998,153  9/51  France.

RICHARD C. QUEISSER, *Primary Examiner.*

ISAAC LISANN, *Examiner.*